(12) United States Patent
Poppe

(10) Patent No.: US 8,505,286 B2
(45) Date of Patent: Aug. 13, 2013

(54) DECOUPLING ELEMENT

(75) Inventor: Matthias Poppe, Wennigsen (DE)

(73) Assignee: Witzenmann GmbH, Pforzheim (DE)

(*) Notice: Subject to any disclaimer, the term of this patent is extended or adjusted under 35 U.S.C. 154(b) by 470 days.

(21) Appl. No.: 12/571,532

(22) Filed: Oct. 1, 2009

(65) Prior Publication Data
US 2010/0083646 A1   Apr. 8, 2010

(30) Foreign Application Priority Data

Oct. 1, 2008 (DE) .......................... 10 2008 049 873

(51) Int. Cl.
F01N 3/02 (2006.01)
F01N 1/00 (2006.01)

(52) U.S. Cl.
USPC .............................................. 60/311; 60/322

(58) Field of Classification Search
USPC ........... 60/297, 311, 322, 324, 404; 422/179; 55/DIG. 30, 334, 336, 367, 374, 378, 381, 55/385, 385.3; 95/147, 152, 285; 285/49
See application file for complete search history.

(56) References Cited

U.S. PATENT DOCUMENTS

| | | | | |
|---|---|---|---|---|
| 4,927,608 A * | 5/1990 | Worner et al. | ................ | 422/179 |
| 5,346,675 A * | 9/1994 | Usui et al. | .................... | 422/180 |
| 5,961,931 A * | 10/1999 | Ban et al. | ....................... | 422/171 |
| 6,013,118 A * | 1/2000 | Matsunuma et al. | ......... | 55/282.3 |
| 6,669,912 B1 * | 12/2003 | Udell | ............................. | 422/179 |
| 6,824,745 B2 * | 11/2004 | Roth | ............................. | 422/179 |
| 6,919,051 B1 * | 7/2005 | Roth | ............................. | 422/179 |
| 8,001,774 B2 * | 8/2011 | Onodera et al. | ............... | 60/295 |
| 2002/0162325 A1 * | 11/2002 | Kato et al. | ..................... | 60/297 |
| 2005/0036927 A1 * | 2/2005 | Roth | ......................... | 423/213.2 |
| 2007/0151231 A1 * | 7/2007 | Rinaldi | ............................ | 60/286 |
| 2008/0302091 A1 * | 12/2008 | Nardi et al. | ..................... | 60/297 |
| 2009/0205325 A1 * | 8/2009 | Kistner et al. | ................... | 60/297 |

FOREIGN PATENT DOCUMENTS

| | | |
|---|---|---|
| DE | 19722603 | 8/1998 |
| DE | 20003386 | 5/2000 |
| DE | 10002284 A1 * | 7/2001 |
| DE | 10249739 | 5/2004 |
| DE | 10307651 | 9/2004 |
| DE | 10339094 | 3/2005 |
| EP | 1179673 | 2/2002 |

OTHER PUBLICATIONS

Machine translation of DE10002284 A1.*

* cited by examiner

Primary Examiner — Kenneth Bomberg
Assistant Examiner — Jason Sheppard
(74) Attorney, Agent, or Firm — Volpe and Koenig, P.C.

(57) ABSTRACT

A decoupling element (11) for use with exhaust-gas systems, including an at least partially corrugated bellows (13) having at least two ends in the form of an inlet (E) and an outlet (A) for the flow (S) of the exhaust gas through the decoupling element (11). A filter element (12') for filtering the exhaust-gas flow (S) is arranged at least partially in the interior (I) of the decoupling element (11) and the filter element (12') has a self-supporting construction, in particular, without carrier and/or support bodies.

14 Claims, 6 Drawing Sheets

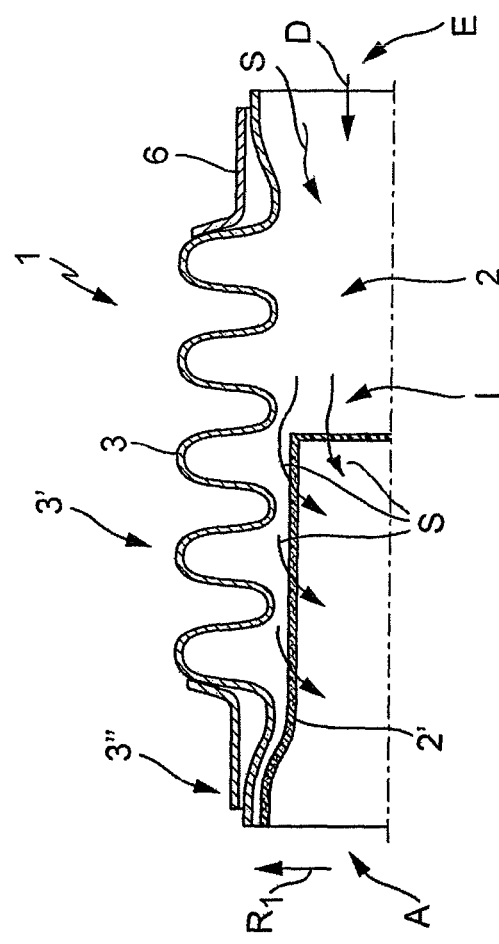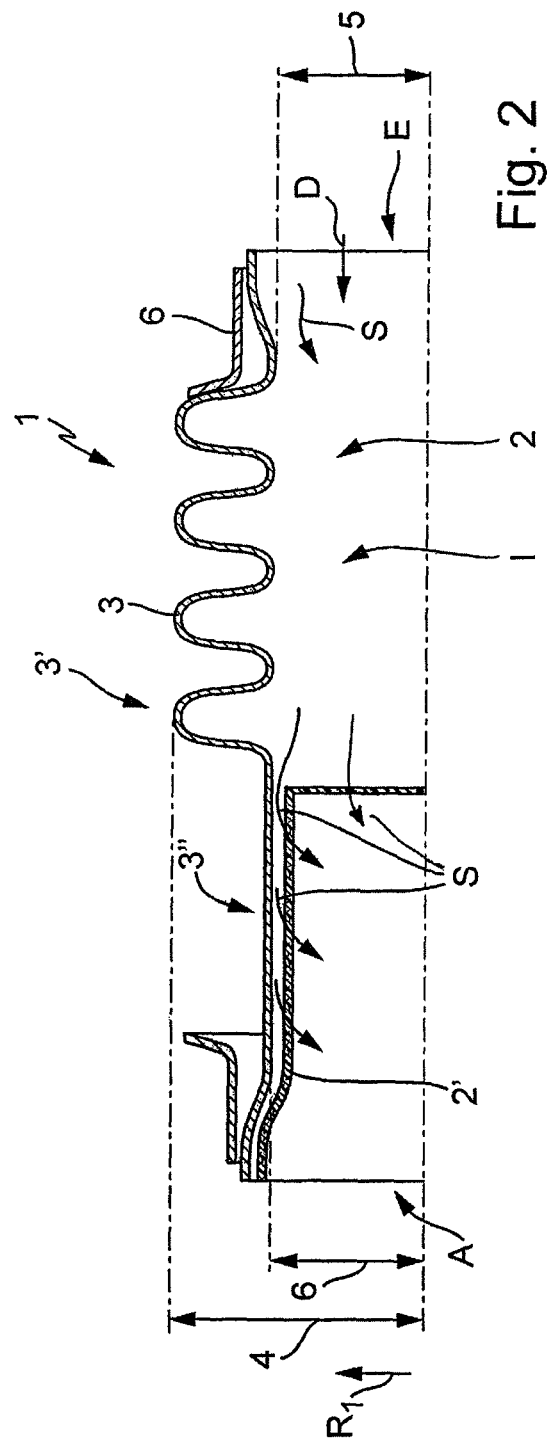

DECOUPLING ELEMENT

CROSS-REFERENCE TO RELATED APPLICATIONS

This application claims the benefit of German Application No. DE 10 2008 049 873.4, filed Oct. 1, 2008, which is incorporated herein by reference as if fully set forth.

BACKGROUND

The invention relates to a decoupling element for use with exhaust-gas systems and with an essentially hollow cylindrical shape with an especially circular or approximately oval cross section, at least consisting of a partially screw-thread-shaped or annular-corrugated bellows and with at least two ends in the form of an inlet and an outlet for the passage of an exhaust gas flow through the decoupling element, wherein a filter element for filtering the exhaust gas flow is arranged at least partially in the interior of the decoupling element.

Such decoupling elements are typically used especially in the field of automotive engineering and are integrated or interconnected in the exhaust-gas system of the engine. In this way, engine movements, as well as vibrations, shocks, and thermal expansions in the exhaust-gas systems due to the exhaust gas flowing out of the engine are absorbed. A portion of the exhaust gases is usually recirculated in a controlled manner into a combustion chamber of the engine. The purpose of this recirculation of exhaust gases is to reduce the combustion temperature in the cylinders of the engine and thus to reduce the formation of nitrogen oxides in the combustion of fuel. For the introduction or recirculation of exhaust gases into the combustion chamber of the engine, in the state of the art, so-called internal and external exhaust-gas recirculation processes are known.

In the case of internal exhaust-gas recirculation, in contrast to external exhaust-gas recirculation that requires a separate recirculation line, the combustion temperature in the cylinders is reduced by increasing the corresponding valve overlap between the intake valve and exhaust valve of each cylinder, so that a portion of the combusted exhaust gases is not ejected from the cylinder. Therefore, the combustion temperature for a new combustion of fuel in the cylinders decreases and a smaller amount of nitrogen oxides is produced.

For reducing the combustion temperature in the cylinders of the engine, external exhaust-gas recirculation is also possible. In the case of external exhaust-gas recirculation, an exhaust-gas line of the exhaust-gas system and an intake system of the engine are connected by an additional exhaust-gas recirculation line arranged outside of the engine. External exhaust-gas recirculation is further differentiated into high-pressure exhaust-gas recirculation (H-EGR) and low-pressure exhaust-gas recirculation (L-EGR). Due to stricter exhaust-gas limits, especially in the case of nitrogen oxides, however, the use of an L-EGR line has increased. If an L-EGR line is used, the removal of the exhaust gas for recirculation into the combustion chamber of the engine takes place downstream of a diesel particulate filter arranged in the exhaust-gas system and the recirculated exhaust gas is introduced into the combustion chamber of the engine typically before a turbocharger or compressor. The exhaust-gas recirculation increases the quantity of the recirculated exhaust gas in the combustion chamber of the engine and reduces the combustion temperature in the combustion chamber in the engine, which finally counteracts the generation of nitrogen oxides in the combustion of fuel.

If an (external) L-EGR line is used, with respect to decoupling oscillations and for compensating for assembly tolerances, correspondingly high requirements compared with internal exhaust-gas recirculation must be satisfied, because additional lines, attachment points, etc. must be used. Another problem in the case of external L-EGR is the release of particles from the diesel particulate filter. These particles are led by the recirculated exhaust gas, first, into the EGR cooler and accumulate in this cooler over time and, second, these particles are introduced upstream of the turbocharger or compressor into the intake system of the main engine and consequently can damage the turbocharger or compressor, as well as pistons and valves of the engine, or can significantly shorten the service life of the turbocharger or compressor or components of the engine.

In the state of the art, it is here already known to guarantee the decoupling of oscillations by a bellows integrated into the L-EGR line, wherein the bellows is typically arranged on the end of the exhaust-gas recirculation line closest to the diesel particulate filter. Also with a high degree of complication, a device is arranged downstream of this bellows in the exhaust-gas recirculation line for separating the particles of the diesel particulate filter named above from the exhaust-gas recirculation flow, in order to prevent damage to the turbocharger, compressor, or components of the engine.

A disadvantage in the state of the art is that the arrangement of an additional particulate separation device in an EGR line is difficult and expensive, because additional joining points are produced and additional parts for the mounting, sealing, etc. are required. Furthermore, the requirements on installation space are also very strict: along the EGR line there must be both the particulate separation device and also a decoupling section for decoupling oscillations. This also causes an increased total weight of the EGR line.

In order to actually be able to perform a particulate separation as well as decoupling along the EGR line, the guidance of the EGR line, the so-called routing, is correspondingly complicated due to the given small installation space. This leads to flow losses in the recirculated exhaust-gas flow and makes the use of economical standard components more difficult. Finally, in the state of the art for particulate separation, typically a non-woven material or a pleated filter is used, wherein the non-woven material is used as a deep-bed filter and the pleated filter is used as a surface filter. The use of a non-woven material and also a pleated filter in a separate housing is also very expensive.

In the state of the art, for example, in DE-A 197 22 603, it is already known to combine a decoupling element for exhaust-gas systems with a filter element in the form of a catalytic converter. Here, the catalytic converter for filtering the exhaust-gas flow is arranged at least partially in the interior of the decoupling element. If this is transferred to the present area of application of the exhaust-gas recirculation, the installation space required for the filtering and decoupling can be reduced, in that the decoupling element, especially the bellows, acts as a housing for the filter element. Simultaneously, the exhaust-gas flow is filtered, so that particles, for example, from an upstream diesel particulate filter, are filtered out from the recirculated exhaust-gas flow and thus an exhaust-gas turbocharger connected before the engine in the direction of flow and also the components of the engine themselves are no longer damaged.

In the European Patent Application EP 1 179 673 A2, a filter element for filtering an exhaust-gas flow is indeed also already disclosed that is integrated in a connection line for the exhaust-gas recirculation. Decoupling or damping of oscillations of the noted connection line from the internal combustion engine is thus not possible, because a corresponding sleeve is provided only for the thermal isolation of the connection line and the intake device of an internal combustion engine from each other at the end of the connection line that is arranged in the region of the intake device of the internal combustion engine.

Due to the reduced installation space of the decoupling element and filter element, the relocation or construction of an L-EGR line is also considerably simplified: not only are fewer individual parts needed for the arrangement and attachment of the L-EGR line, but also standardized, economical line parts or pipes could likewise be used. In addition, flow losses are reduced. Because the filter element is arranged at least partially in the interior of the decoupling element, the weight of the decoupling element and the installed filter element is also significantly less than the sum of the weights of the corresponding individual parts of the state of the art, because a separate filter housing for the filter element can be eliminated.

Such a decoupling element with a filter element can be used universally for different types of engines; only the respective connection pipes must be adapted to corresponding installation-space requirements. The design of the bellows is here adapted to specifications with respect to the desired decoupling effect. Thus, the filter element could be formed as a catalytic converter and, in this way, decoupling and reduction of pollutants both in the non-recirculated exhaust-gas flow and also in the recirculated exhaust-gas flow of the main engine are possible and therefore deposits in the EGR cooler are prevented.

SUMMARY

Starting from these conditions, the present invention is directed to a decoupling element that exhibits an improved operating behavior in the case of the typical decoupling of oscillations, the compensation of assembly tolerances and thermal expansions, as well as the separation of solid particles from the exhaust-gas flow.

The invention is based on the knowledge that, for the combination of a decoupling element with a filter element—thus, this may also be advantageous with respect to the installation space and the service life of the downstream turbocharger, compressor, or the like—the pressure loss across the decoupling element is large enough that the advantages of the exhaust-gas recirculation are partially negated or cannot be achieved effectively. In order to eliminate disadvantageous effects, the invention provides a filter element that has a self-supporting construction and/or is constructed without carriers and/or without support bodies, in order to therefore achieve a significantly reduced pressure loss, wherein it can be guaranteed that the operating behavior can be improved relative to the known constructions. While prior attention was turned just toward the stability of a filter, the present invention is concerned with the subject of the pressure loss that is caused by the filter and that negatively affects the exhaust-gas recirculation.

The essential feature for the self-supporting filter element that has no carrier and/or support bodies is the fact that the filter area is as large as possible and is thus not blocked or covered by carriers or support bodies or other auxiliary means. Therefore, the support area otherwise responsible for a large pressure loss is eliminated and the filter element is made almost completely from areas with a filtering function that are permeable for the exhaust-gas flow.

In connection with this it is a great advantage if the filter element is constructed such that at least 70%, and in particular at least 80% of the outer surface of the filter element is permeable and can work as a filter surface. This large surface area of about 80% or more provides for a minimal pressure loss, and therefore a particularly good working operation of the decoupling element according to the invention. In the known filter elements, carriers, supports or other support components are provided, that further reduce the effective filter surface, for example by resting against the permeable filter surface—thereby covering it and making it impermeable, so that it no longer can fulfill its function as a filter surface. It is precisely these support components that are now eliminated according to the present invention.

Here it is especially advantageous when the filter element has a round-bodied or bag-shaped construction with a filter tip that has, in particular, a conical or round-bodied construction. In addition, conical, frustum, or cylinder shapes are also possible (which are here to be understood as falling under the general term "round-bodied"), wherein, however, the mentioned bag-shaped construction is responsible for a significantly enlarged filter surface that likewise has a very favorable effect with respect to the pressure loss. At this point it should be noted that the mentioned round-bodied or bag-like shape according to the invention (which corresponds, in one preferred embodiment, approximately to the shape of a paper tea strainer) should include any especially bulged construction deviating from a disk shape, that is, also, for example, sleeve-shaped filter elements.

In this connection, it is especially advantageous for the service life of such a decoupling element when the filter tip of the filter element, that is, for example, the bag-shaped end, the round-bodied bulge, and the like is turned to face the inlet of the decoupling element. In this way it can be achieved that the filter element is not blocked in the region of the filter tip over time with particles filtered out from the exhaust-gas flow, which would otherwise increase the pressure loss over the service life; instead, the particles captured from the exhaust-gas flow fall from the filter element into the region of the decoupling element surrounding the filter element, that is, in particular, into the bellows body. The orientation of the filter tip in the direction of the inlet of the decoupling element also leads to a reduction of the flow losses in comparison with a reversed arrangement.

It is further recommended when the filter base opposite the filter tip is turned to face the outlet of the decoupling element and/or when the filter element is fixed by the filter base especially only in the region of the outlet of the decoupling element. In this way it is guaranteed that the filter element does not negatively affect the function of the decoupling element and especially the corrugated bellows. This is because, for the attachment on only one end and the overall bag-shaped construction without a support body, it is obvious that the diameter ratios of the filter element can be selected relative to the bellows so that the filter element does not impact the inside of the bellows when the bellows deflects. And even if the filter element would impact the inner wall of the bellows in the extreme case, then the filter element without a support body would be sufficiently flexible, in order to withstand such contact without damage.

Advantageously, the filter element is designed so that the decoupling element has a pressure loss in the range of between approximately 3 and 30 mbar and especially in the range of between only 3 and 20 mbar for a temperature of the exhaust gas on the order of magnitude of approximately 250° C., for a mass flow of the exhaust gas in the range of 40-80 kg/h, and also for an at least approximately 90% filtering of particles of a particle size between 50 and 500 µm contained in the exhaust gas.

However, this should not be enabled by a poorly functioning, i.e., too large a filter element—instead, the filter element is to be designed so that it exhibits at least a 90% and especially an approximately 99% filtering of particles of the particle size between 95 and 105 μm contained in the exhaust gas.

As previously mentioned, the decoupling element is here designed so that the low pressure loss according to the invention between 3 and 30 mbar occurs for an exhaust gas that features—at a given mass flow in the range of 40-80 kg/h—a temperature on the order of magnitude of approximately 250° C. It is especially preferred when the pressure loss lies in the range of between approximately 10 and 13 mbar for a temperature of the exhaust gas on the order of magnitude of approximately 250° C., for a mass flow of the exhaust gas on the order of magnitude of approximately 80 kg/h, and also for an approximately 99% filtering of particles of a particle size between 95 and 105 μm contained in the exhaust gas.

It should be noted that the pressure loss is different for different temperature ranges, namely lower for lower temperatures and larger for higher temperatures. More details hereto are given from the plot enclosed as FIG. 7 and the associated description. The values specified in the claims do not have to correspond to the actual operating conditions; instead they are used primarily to be able to compare decoupling elements with different filter constructions with each other and to be able to prove the presence of the properties according to the invention also for other decoupling elements typically used for other conditions.

The filter element of the present invention is used especially for filtering out solid, especially ceramic particles, which are contained in the exhaust-gas flow. In an embodiment with a catalytic converter, the filter element is predominantly used for filtering out HC and CO from the exhaust gas.

As already given from the preceding description, the filter element is advantageously arranged coaxial to the bellows in the decoupling element; when exhaust gas now flows through the decoupling element, then this means that the filter element can carry a flow of exhaust gas at least in its radial direction. Due to the bag-shaped or round-bodied construction, an axial component is also added to this radial component, which overall has an especially favorable effect on the pressure loss, above all relative to an only axial flow.

While there are different options with respect to the construction of the filter element in being able to make this element, for example, from a meshwork, a metal non-woven material, or a square meshwork, a metal pleated meshwork acting as a surface filter has proven to be advantageous, which is preferably constructed as a smooth pleated meshwork with an especially preferred ratio of 30 warp threads to 120-150 weft threads per inch$^2$. Another preferred filter element is made from a bag-shaped or conical sintered metal non-woven filter with an axial filter length (axial distance between filter base and filter tip) of approximately 65-70 mm. For variation of the filter length, it can be realized that the pressure loss decreases in the monitored region with greater length (by which the filter area becomes larger accordingly). Likewise, the pressure loss decreases when a bag-shaped, i.e., flatter and wider filter element is used instead of a conical filter element, wherein this bag-shaped element has a somewhat larger active filter area. Thus, the parameters listed for comparison purposes, especially the pressure loss, are related to a comparable or constant filter surface, because these parameters change as a function of the filter shape and size.

Additional advantages can be achieved for the decoupling element according to the invention in that it has a device for charge detection that measures, in particular, the pressure difference across the decoupling element. During the use of the decoupling element, if an increased formation of particles is produced, for example, due to damage to the diesel particulate filter, the deposition of soot on the filter due to unfavorable mixed combustion, or the like, this defect can be immediately detected and the filter of the decoupling element or the entire decoupling element can be exchanged.

Additional advantages can be achieved by a device for changing the exhaust-gas flow, especially by an exhaust-gas flap that is arranged, in particular, in the region of the inlet of the decoupling element. In this way, the recirculation rate of the exhaust-gas flow can be set in an ideal way to the present values and especially to the properties of the filter element. Finally, a device for cooling the filter surface could be provided that advantageously operates electrically; likewise, cooling can be achieved by a suitable construction of the bellows corrugation geometry.

Likewise, it lies within the scope of the invention to form the filter element as a known EGR catalytic converter or also as a cyclone filter. Furthermore, it is possible to form the filter element as a cooler or pre-heating system, because the bellows of the decoupling element allows an improved heat absorption or dissipation on its surface increased by the typically provided, partially corrugated regions.

If the filter element is arranged in the region of the inlet (and/or outlet) of the decoupling element, it is possible in a simple way to retrofit existing decoupling elements without filter elements with a filter element, for example, by inserting a filter element into the region of the inlet and/or outlet, or to replace the filter element for maintenance purposes, without having to open or completely replace the entire decoupling element. In addition, the filter element could be fixed together and fastened on one end of the decoupling element in a simple manner.

Advantageously, the filter element is fixed by fusing or compression on the decoupling element, especially on the bellows. In this way, a simple and economical attachment of the filter element on the decoupling element is possible.

So that the filter element experiences the smallest possible loads and forces due to the absorption of oscillations through the decoupling element, it is advantageous when the filter element is arranged in the region of a fixed side of the decoupling element. The fixed side of the decoupling element is here the end of the decoupling element that is exposed to smaller movements and thus loads due to the oscillations of the engine to be absorbed by the decoupling element. In this way, the service life of the filter element is increased.

If the filter element carries an exhaust-gas flow in the axial and/or radial direction, this allows—as already mentioned—an optimal throughput of the exhaust-gas flow and simultaneously effective filtering of the exhaust-gas flow. Here, it lies in the scope of the invention that, in the case of a filter element constructed as a centrifugal separator or cyclone filter, the exhaust-gas flow into the filter element is essentially tangential with respect to the radial periphery of the filter element and is then deflected on an essentially circular track. A majority of the particles to be filtered are then separated from the exhaust-gas flow by the effective centrifugal force due to the circular track of the exhaust-gas flow.

Advantageously, the filter element and/or the bellows have a one-layer or multi-layer construction. A multi-layer filter element allows further improvement or adaptation of the filter effect, while a multi-layer bellows is improved not only with respect to its stability, but it is also possible to adapt the movement of the decoupling element to the corresponding requirements for the simultaneous guarantee of the gas tightness of the decoupling element.

In order to fix the filter element even more easily and economically in the decoupling element, the filter element can be arranged in a non-corrugated region of the bellows. The damping of the bellows or the decoupling element can be reduced in this way, without the filtering element contacting the bellows when the bellows are loaded and without the filter element or the bellows becoming damaged due to friction against each other.

Furthermore, it is also possible to adapt the non-corrugated region of the bellows to the shape, in particular, to the diameter or geometry of the filter element. In this way, a greater filter effect of the filter element is possible without having to lengthen the decoupling element for this purpose and thus having to increase the installation space needed for this element for assembly.

Additional features and advantages of the present invention emerge from the claims and also from the subsequent description of embodiments

BRIEF DESCRIPTION OF THE DRAWINGS

The invention is described in further detail below with reference to the drawings. Shown are:

FIG. 1 is a half cross-sectional view of a decoupling element according to the invention with a filter element, FIG. 2 is a half cross-sectional view of another embodiment of a decoupling element according to the invention with a filter element arranged in the non-corrugated region of the bellows.

DETAILED DESCRIPTION OF THE PREFERRED EMBODIMENTS

Figure 3:
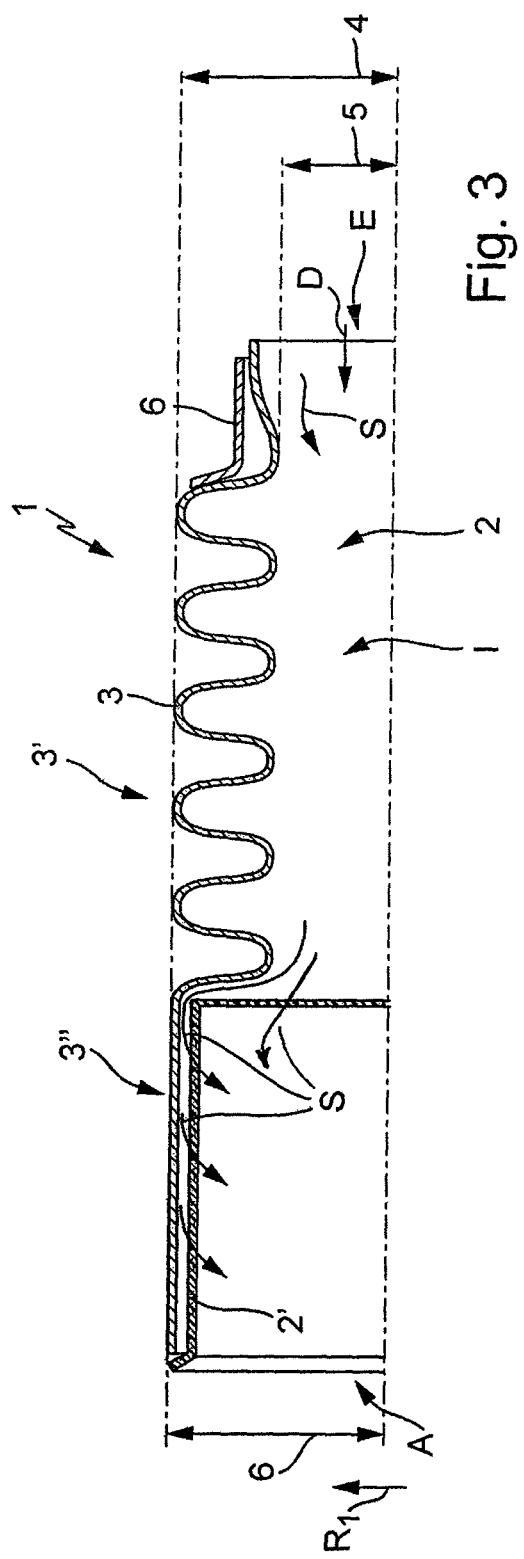
FIG. 3 is a half cross-sectional view of another embodiment of a decoupling element according to the invention with a filter element according to FIG. 2, FIGS. 4a and 4b are views of another embodiment of a decoupling element according to the invention with filter layers arranged coaxially.

In FIG. 1, a drawing of a decoupling element 1 according to the invention is shown in an axial section with two ends E, A on the right and left sides of the drawing, respectively, wherein the right end acts as an inlet E of an exhaust-gas flow S and the left end acts as an outlet A of the exhaust-gas flow S. The exhaust-gas flow S flows through the decoupling element 1 from the inlet E in the direction D of the outlet A. This direction is designated as the through-flow direction D. Furthermore, the decoupling element 1 has a bellows 3 made from metal with a corrugated region 3'. In the interior I of the decoupling element 1 there is a filter element 2' that extends essentially along the axial direction and starting from the outlet A of the decoupling element into the decoupling element against the through-flow direction D and has essentially a circular or approximately oval cross section advantageously corresponding to the cross section of the decoupling element 1.

Now if the exhaust-gas flow S appears at the inlet E into the decoupling element 1, then the gas initially flows through the region 2 of the interior I of the decoupling element 1 not charged by the filter element 2'. Then the exhaust-gas flow S travels, e.g., in the radial direction $R_1$ into the filter element 2'. After entry into the filter element 2', the exhaust-gas flow S is filtered by the filter element 2' and then emerges, in turn, parallel to the through-flow direction D through the outlet A of the decoupling element 1. Furthermore, the filter element 2' is also arranged in the corrugated region 3' of the bellows 3.

For damping the bellows 3 and also for protecting the bellows 3 against external damage, the bellows 3 could have an external knitted netting and/or a meshwork on its radial outer side. Simultaneously, the decoupling element could also have, in the region of the inlet and/or outlet E, A, an end sleeve 6 that is used for the mutual attachment of the bellows 3, external knitted netting, etc. In order to increase the movement of the bellows 3 and thus the flexibility of the decoupling element 1, the filter element 2' could also be shortened with respect to its axial extent.

FIG. 2 shows another embodiment of the decoupling element 1 from FIG. 1. Here, the filter element 2' now extends in the axial direction merely in the non-corrugated region 3" of the bellows 3. The non-corrugated region 3" is shown larger in FIG. 2 in contrast to FIG. 1 and now extends nearly across half the entire axial extent of the decoupling element 1. The non-corrugated region 3" of the bellows 3 is here adapted accordingly to the geometry, in particular, to the radius of the filter element 2', and the axial extents of the non-corrugated region 3" and filter element 2' are essentially the same size. Furthermore, just like in FIG. 1, the inner radius 5 of the corrugated region 3' and the inner radius 6 of the non-corrugated region 3" of the bellows 3 are essentially the same size.

In FIG. 3, another embodiment of a decoupling element 1 according to the invention is shown. The construction here essentially corresponds to the shown construction of the decoupling element 1 from FIG. 2. In contrast to FIG. 2, the inner radius 5 of the corrugated region 3' of the bellows 3 now corresponds no longer to the inner radius 6 of the non-corrugated region 3", but instead the inner radius 6 of the non-corrugated region 3" and is now constructed so that it essentially corresponds to the outer radius 4 of the corrugated region 3' of the bellows 3. Therefore, in comparison with the embodiment of the decoupling element 1 in FIG. 2, a larger filter effect could be achieved due to a larger volume of the filter element 2' for the same axial length of the decoupling element 1 with a filter element 2'.

Figure 4A:
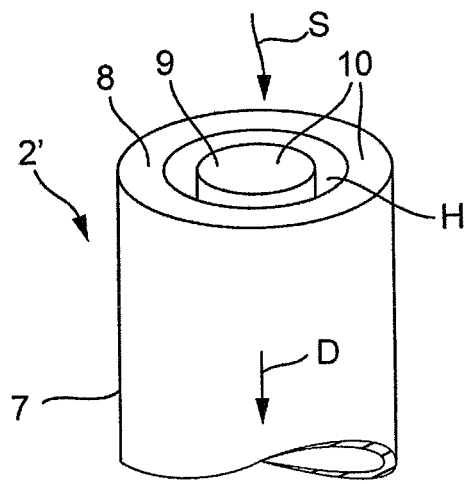

In FIG. 4a, another embodiment of a filter element 2' is shown in the interior I of the decoupling element 1 in a perspective three-dimensional view. This filter element 2' carries an exhaust-gas flow S in the through-flow direction D. The filter element 2' here has a sheet-metal cylinder 7 on its radial outer side. On the radial inner side of the sheet-metal cylinder 7, as a filter layer, there is a first filter cylinder 8 coaxial to the axis of the filter element 2'. A coaxial recess H that extends partially in the axial direction of the filter element 2' is arranged, in turn, on the radial inner side of the cylinder. Finally, on its radial inner side and essentially along the entire axial extent of the filter element 2' there is a second filter cylinder 9 as another filter layer. In addition, the filter element 2' has, on its one end, end faces 10 that are arranged in a coaxial arrangement and that cannot carry an exhaust-gas flow S. The exhaust-gas flow S can flow only indirectly into the filter element 2' via the recess H in the first filter cylinder 8 or second filter cylinder 9 of the filter element 2'.

Figure 4B:
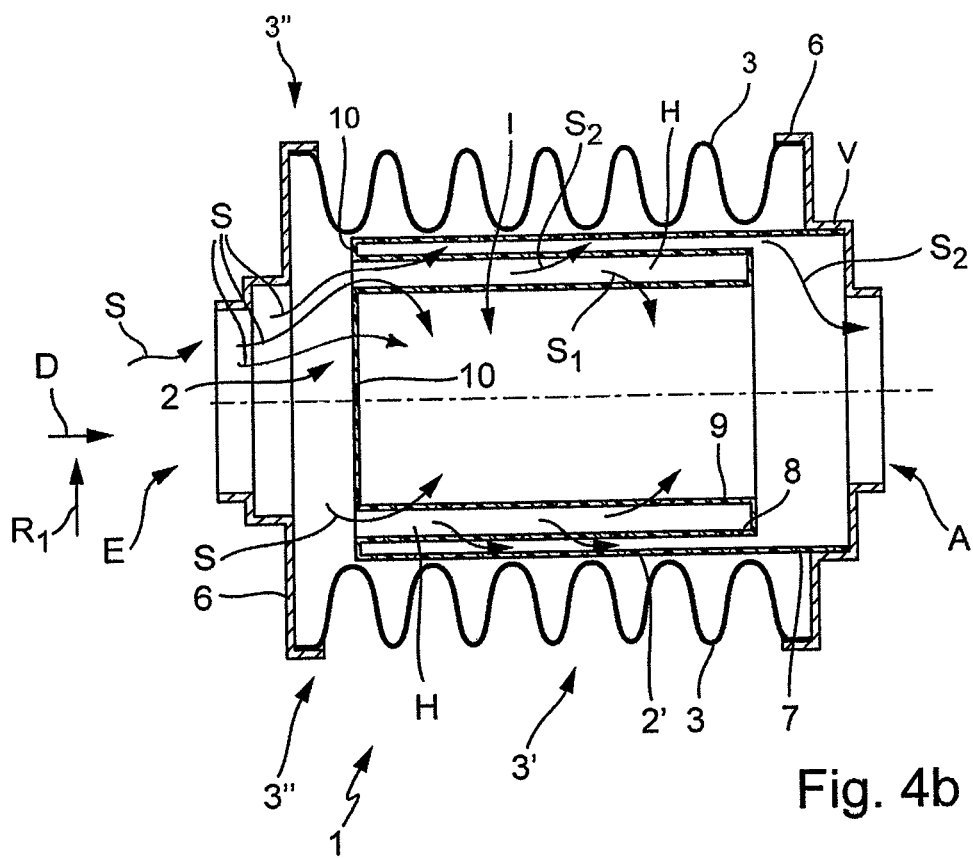

FIG. 4b now shows a filter element 2' arranged in the interior I of the decoupling element according to FIG. 4a in the axial direction of this decoupling element 1. The flow profile of an exhaust-gas flow S in the case of flowing through a decoupling element 1 in the through-flow direction D is as follows: initially the exhaust-gas flow S enters into the decoupling element via the inlet E of the decoupling element 1 and initially flows through the region 2 of the decoupling element 1 that is not charged by the filter element 2'. Then the exhaust-gas flow S meets the filter element 2', wherein the end faces 10 of the filter element 2' oriented in the radial direction $R_1$ do not allow through flow of the exhaust-gas flow S. The exhaust-gas flow S thus enters into the recess H of the filter element 2' and is then divided into two partial exhaust-gas flows $S_1$ or $S_2$. The partial exhaust-gas flow $S_1$ enters via the radial outer side of the second filter cylinder 9 that is arranged along the recess H into this cylinder for filtering, while the partial exhaust-gas flow $S_2$ initially enters into the filter cylinder for filtering via the radial inner side of the first filter cylinder 8 arranged along the recess H. The partial exhaust-gas flow $S_2$ then flows through the first filter cylinder 8 in the axial direction and is finally transferred into the outlet A in the region of the filter element 2' not charged by the recess H. The two partial exhaust-gas flows $S_1$, $S_2$ are united again to form a single exhaust-gas flow S that is then output from the decoupling element 1 via the outlet A.

Furthermore, it lies in the scope of the invention to arrange the filter element both in the corrugated and also in the non-corrugated region of the bellows, optionally it could also extend completely along the axial direction in the interior of the decoupling element. In addition, it is also possible that the filter element is partially arranged outside of the decoupling element, for example, in order to even further improve the filter volume of the filter element and thus its filter effect.

Figure 5:
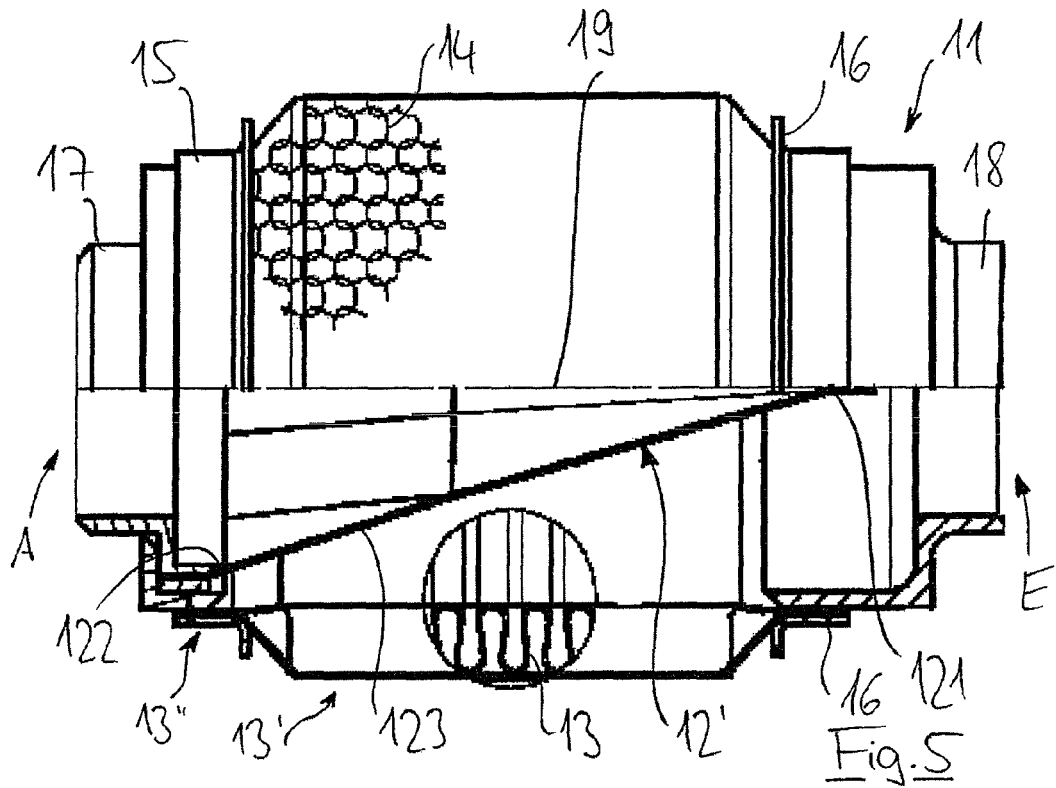
FIG. 5 is a view of an alternative embodiment of a decoupling element according to the invention with a filter element in partially sectioned side view.
Figure 6:
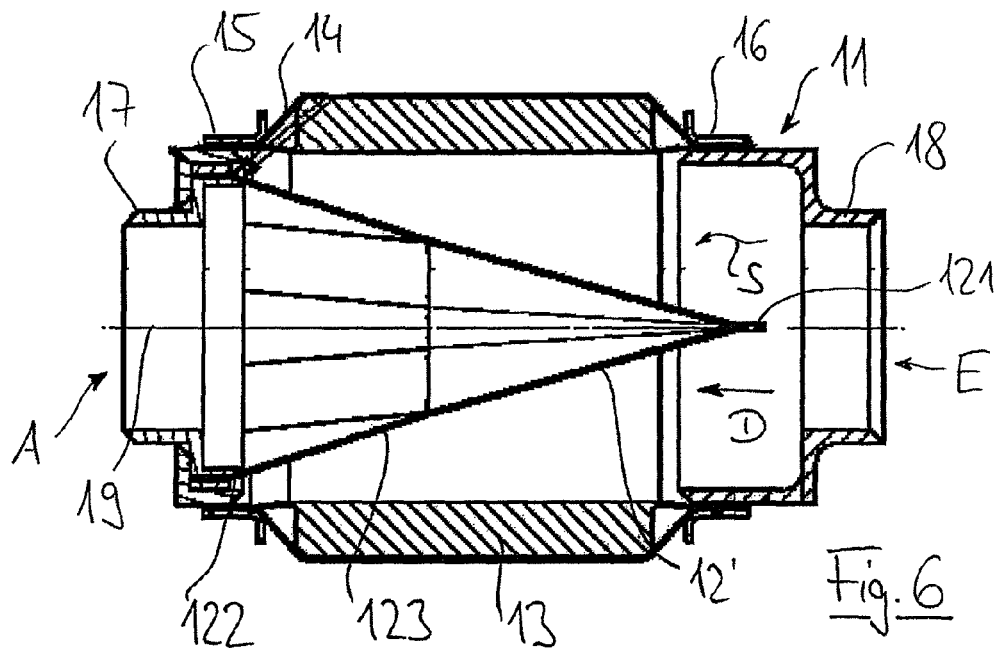
FIG. 6 is a complete longitudinal cross-sectional side view of the decoupling device from FIG. 5.

FIGS. 5 and 6 show a decoupling element 11 with a specially constructed filter element 12' that is formed according to the invention with a bag-shaped construction with a filter tip 121, an annular filter base 122, and a filter surface 123 that has a bag-like shape in the example (that can be seen, in particular, also from FIGS. 8, 9, and 10) and that is made from a metal pleated meshwork.

The decoupling element 11 has, as additional components, an annular-corrugated bellows 13 with two smooth cylindrical connection ends 13" and a corrugated, middle region 13'. A knitted netting jacket 14 is drawn over the bellows 13, wherein this jacket is fixed by end rings 15, 16 on the smooth cylindrical connection ends 13". The connection ends of the bellows are each provided, in turn, with a connection flange 17, 18 to which the connection piping (that is not shown in the drawing) can be connected.

The decoupling element 11 constructed in this way has an inlet E and an outlet A for the exhaust-gas flow S that flows through the decoupling element in the through-flow direction D.

According to the invention, the filter element is arranged so that, with its filter tip 121, it is turned toward the inlet E. In this way, a reduction of the pressure losses on the order of magnitude of approximately 30% in comparison with a disk-shaped filter element provided with a support body can be achieved. In addition, through such an exhaust-gas flow onto the filter tip, the flow losses can be kept small. Finally, the particles filtered out from the exhaust-gas flow fall into the bellows body 3, thus they do not remain in the interior of the filter. In this way, an increase of the pressure losses over the service life is avoided, because the particles are not collected in the interior of the filter, but instead the filter is cleaned practically automatically in a regular and continuous way.

The bag or sleeve shape of the filter element 12' also produces greater movement freedom relative to the bellows 13 and the connection flange 18 that do not run the risk of colliding with the filter element or the filter tip 121, even for large deflections.

As can be seen easily from FIG. 6, an exhaust-gas flow S through the filter element 12' leads not only to a flow in the axial direction, but also, due to the orientation of the filter surface 123 inclined relative to the center axis 19 of the decoupling element 11 that coincides with the center axis 19 of the filter element 12', to the result that there is also a flow in the radial direction, which likewise has a very favorable effect on the pressure loss across the decoupling element.

Concerning the embodiment of the bag-shaped filter element shown in FIGS. 5 and 6, it should be noted that, deviating from this embodiment, other curved or sleeve-shaped filter forms also are within the scope of the present invention and feature similar advantages. The bag-shaped filter element is provided in the region of its filter tip 121 with a fused seam that fixes the metal pleated meshwork in this region and thus provides for a certain degree of stabilization. For sleeve-shaped filter elements or curved or round-bodied filter elements, such a fused seam could be eliminated and the "filter tip" facing the inlet could be formed through corresponding shaping of the meshwork without joining points. In this way, the filter area could be similarly increased in the same manner as leaving out the support bodies or carriers and thus the pressure loss could be reduced accordingly.

As to the illustrates connection flange 17, 18 of the decoupling element 11, due to its smallest possible dimensioning (in the diameter range of 25 to 40 mm up to 56 mm for a passenger car, exhaust-gas systems and an even higher order of magnitude for commercial-vehicle applications), the pressure loss could also be reduced in the region of the connection piping. This is possible by the combination of the decoupling element and filter according to the invention and the possible reduction of the installation space achieved in this way.

Figure 7:
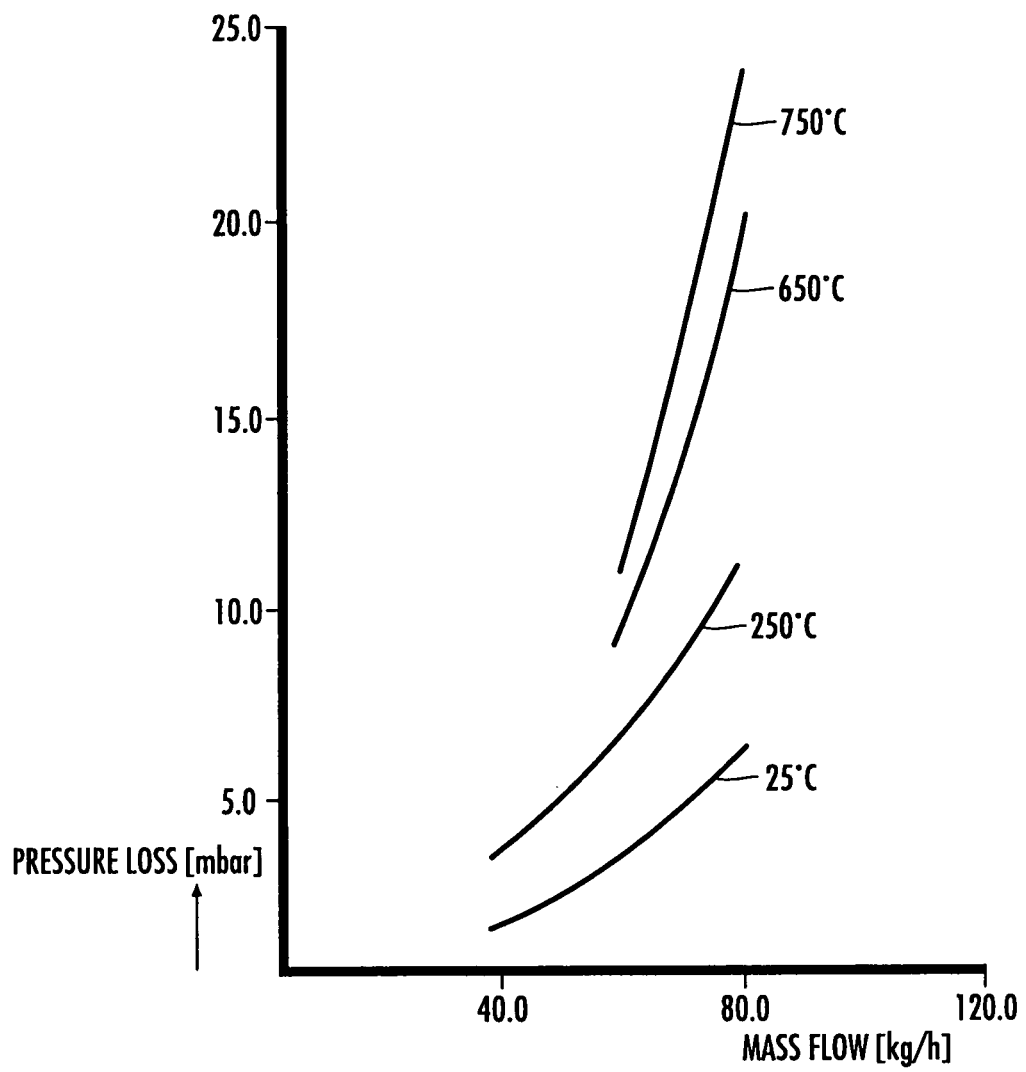
FIG. 7 is a plot with characteristic lines (pressure loss versus mass flow) for different temperatures of the exhaust gas.

FIG. 7 now shows for the present subject matter of the invention according to FIG. 5 or 6 the pressure loss as a function of mass flow for different exhaust-gas temperatures, wherein these values are taken from a measurement at 250° C. and extrapolated accordingly. From this, a clear dependency of the exhaust-gas temperature is to be taken: a higher temperature means—for the same mass flow—a greater pressure loss. In the shown examples, the pressure loss at a temperature lowered from 250° C. to 25° C., that is, lowered by a factor of 10, is reduced to approximately half; at a temperature increased from 250° C. to 750° C., that is, tripled, it increases to approximately twice. Now, in order to be able to compare different decoupling elements or structures with each other, the present invention manages with the specified reference parameters, namely the mass flow, filtering degree, and temperature are set in advance and a pressure loss range is defined as a function of these parameters, wherein this range differs significantly from the state of the art and is responsible for the advantages according to the invention.

Figure 8:
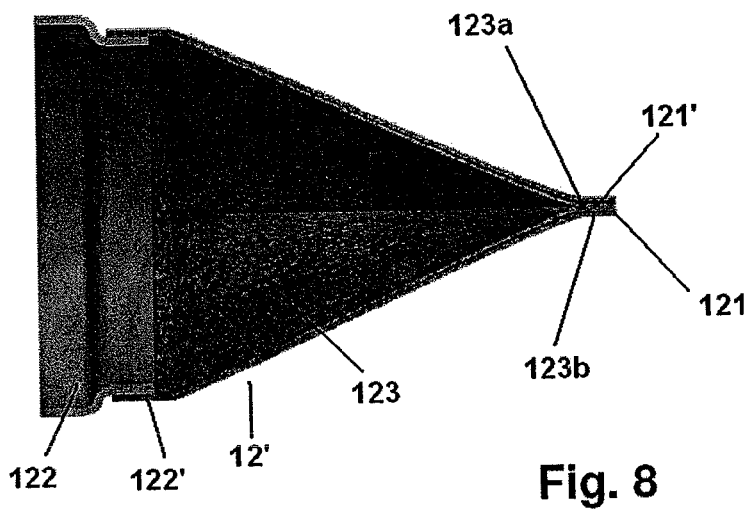
FIG. 8 is a complete longitudinal cross-sectional side view of the filter element from FIG. 5 shown separately.
Figure 9:
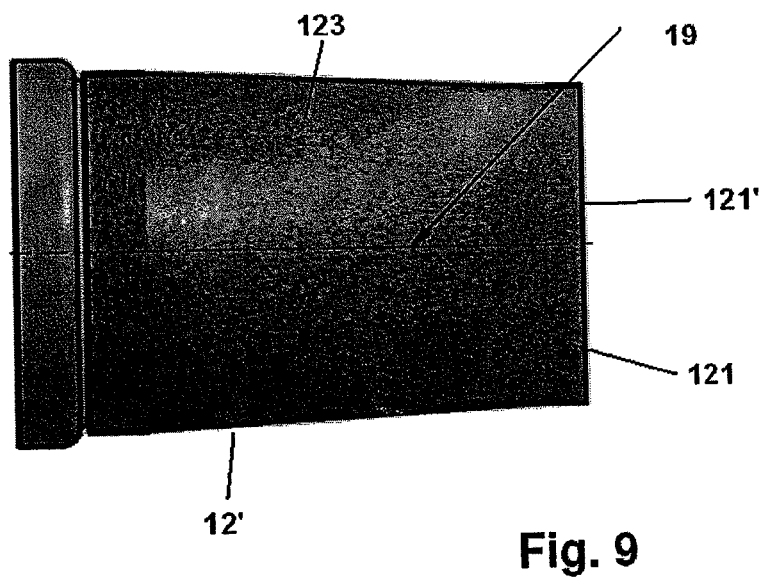
FIG. 9 is a top view of the filter element from FIG. 5 shown separately.
Figure 10:
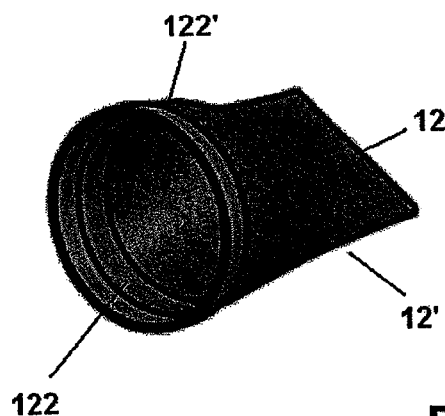
FIG. 10 is a perspective side view of the filter element from FIG. 5 shown separately.

In FIGS. 8, 9, and 10, the filter element 12' from FIGS. 5 and 6 is shown separately in longitudinal section, in top view, and in perspective side view. Here, above all the annular filter base 122 is to be seen that holds the filter area 123, i.e., in the present example the metal pleated meshwork and by which the metal pleated meshwork is fixed on the decoupling element 11 or on the smooth cylindrical connection end 13" of the bellows 13. Because the filter surface 123 is drawn over a portion of the annular filter base 122 consisting of a nonperforated, separate ring, the filter area in this overlapping region is essentially impermeable. A corresponding situation applies to the filter tip 121 in which adjacent layers 123a, 123b of the filter area 123 are fixed by the fused seam 121'. The filter area 123 is not permeable also in the region of the fused seam and cannot work effectively as a filter.

If the entire surface of the filter element 12' is now compared with these impermeable areas 121' and 122', then a remaining overall area of at least 70% is produced, especially of at least 80% of the overall surface that is permeable and that can work effectively as a filter area. This large area ratio of ca. 80% provides for the especially low pressure loss and thus for the especially good operating behavior of the decoupling element according to the invention. In the case of known filter elements, carriers, supports, or other supporting components are provided, which further decrease the effective filter area, for example by resting against the permeable filter surface—thereby covering it and making it impermeable, so that it no longer can fulfill its function as a filter surface. It is precisely these support components that are now eliminated according to the present invention.

The filter element 12' is made, in the case of a preferred embodiment, from a metal pleated meshwork with the following properties: porosity: 80%; air permeability: 1500 l/min dm$^2$ at 200 Pa; permeability factor: $7^{-11}$ m$^2$; filter area: 48 cm$^2$ for a filter length of approximately 65 mm and a filter diameter in the region of the filter base of approximately 40 mm. This preferred filter element has, in the case of an exhaust-gas flow of 250° C. in the region of approximately 33.2 kg/h, a pressure loss of approximately 7 mbar and, in the case of an exhaust-gas flow of 250° C. in the region of approximately 80 kg/h, a pressure loss of approximately 30 mbar. By increasing the filter surface, the pressure loss could change to a certain degree, in particular, could be reduced, wherein it is to be taken into account that the increase of the effective filter area is possible and useful only in certain degrees, in addition, according to the invention a carrier, a support body, or some other supporting component is indeed to be eliminated.

According to the invention, the different embodiments of the filter element 2' from FIGS. 1 to 4 are also self-supporting and have no carrier or support bodies and are therefore constructed with a maximum effective filter area—with the same advantages as in the case of the filter element 12' from FIGS. 5, 6, 8 to 10.

In summary, the present invention offers the advantage that the decoupling element with an integrated filter element according to the invention is optimized with respect to the pressure loss and measures are provided for how the pressure loss could also be essentially maintained over the service life.

The invention claimed is:

1. Decoupling element (1, 11) for use with exhaust-gas systems, comprising an at least partially corrugated bellows (3, 13) having at least two ends that include an inlet (E) and an outlet (A) for a flow (S) of exhaust gas through the decoupling element (1, 11), and a filter element (12') for filtering the exhaust-gas flow (S) is arranged at least partially in an interior (I) of the decoupling element (1, 11), the filter element (12') has a construction that is at least one of self-supporting, without carrier bodies or without support bodies, the filter element (12') is constructed and arranged in the decoupling element (1, 11) to allow throughflow of the exhaust-gas flow (S) in a radial direction and in an axial direction, the filter element has a filter tip (121) which is turned to face the inlet (E); and the filter element (12') has a bag-shaped construction with an annular base and a bag-shaped body that tapers from the annular base to a linear end that forms the filter tip (121).

2. The decoupling element according to at least claim 1, wherein the filter element (12') without carrier or support bodies is fixed in the decoupling element (1, 11).

3. The decoupling element according to at least claim 1, wherein the filter element (12') has a construction such that at least 70% of the surface of the filter element is made from permeable filter material.

4. The decoupling element according to at least claim 1, wherein the filter element (12') is made from a meshwork, a metal non-woven material, a metal pleat, or a square meshwork.

5. The decoupling element according to at least claim 1, wherein
the annular base (122) of the filter opposite the filter tip (121) faces the outlet (A) of the decoupling element (11).

6. The decoupling element according to at least claim 4, wherein the filter element (12') is fixed only in a region of the outlet (A) of the decoupling element (11) with the annular base (122) on the decoupling element.

7. The decoupling element according to at least claim 1, wherein
the filter element (12') is constructed so that the decoupling element (1, 11) has a pressure loss in a range of between approximately 3 and 30 mbar for a temperature of the exhaust gas on an order of magnitude of approximately 250° C., for a mass flow of the exhaust gas in a range from 40-80 kg/h, and also for an at least approximately 90% filtering of particles of a particle size between 50 and 500 µm contained in the exhaust gas.

8. The decoupling element according to claim 1, wherein the filter element (12') is constructed so that the decoupling element (1, 11) has a pressure loss in a range of between approximately 3 and 20 mbar for a temperature of the exhaust gas on the order of magnitude of approximately 250° C., for a mass flow of the exhaust gas in a range of 40-80 kg/h, and also for an at least approximately 90% filtering of particles of a particle size between 50 and 500 µm contained in the exhaust gas.

9. The decoupling element according to at least claim 1, wherein
the filter element 12') is constructed such that the filtering of particles of a particle size between 95 and 105 µm contained in the exhaust gas on an order of magnitude of approximately 99%, and the decoupling element (1, 11) has a pressure loss in a range of between approximately 10 and 13 mbar for a temperature of the exhaust gas on an order of magnitude of approximately 250° C., for a mass flow of the exhaust gas on an order of magnitude of approximately 80 kg/h, as well as for an approximately 99% filtering of particles of a particle size between 95 and 105 µm contained in the exhaust gas.

10. The decoupling element according to at least claim 1, wherein
the filter element (12') is arranged coaxial to the bellows in the decoupling element (1, 11).

11. The decoupling element according to at least claim 1, wherein
the decoupling element has a device for charge detection that measures a pressure difference across the decoupling element.

12. The decoupling element according to at least claim 1, wherein
the decoupling element includes a device for changing the exhaust-gas flow, comprising an exhaust-gas flap that is arranged in a region of the inlet of the decoupling element.

13. The decoupling element according to at least claim 1, wherein
the decoupling element has a device for cooling the filter surface.

14. The decoupling element according to claim 8, wherein the filter element (12') is constructed so that the pressure loss is in a range of between approximately 5 and 15 mbar.

* * * * *